Nov. 5, 1935.    A. IDAIL    2,020,061
INDICATOR
Filed June 13, 1935    2 Sheets-Sheet 1
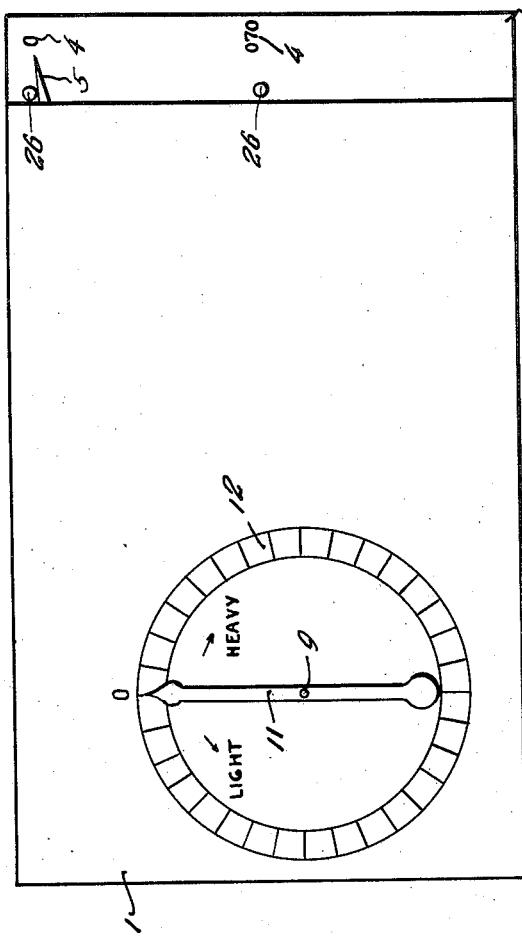
Fig. 1
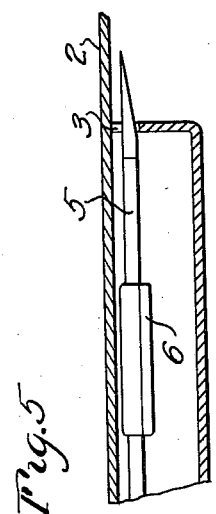
Fig. 5
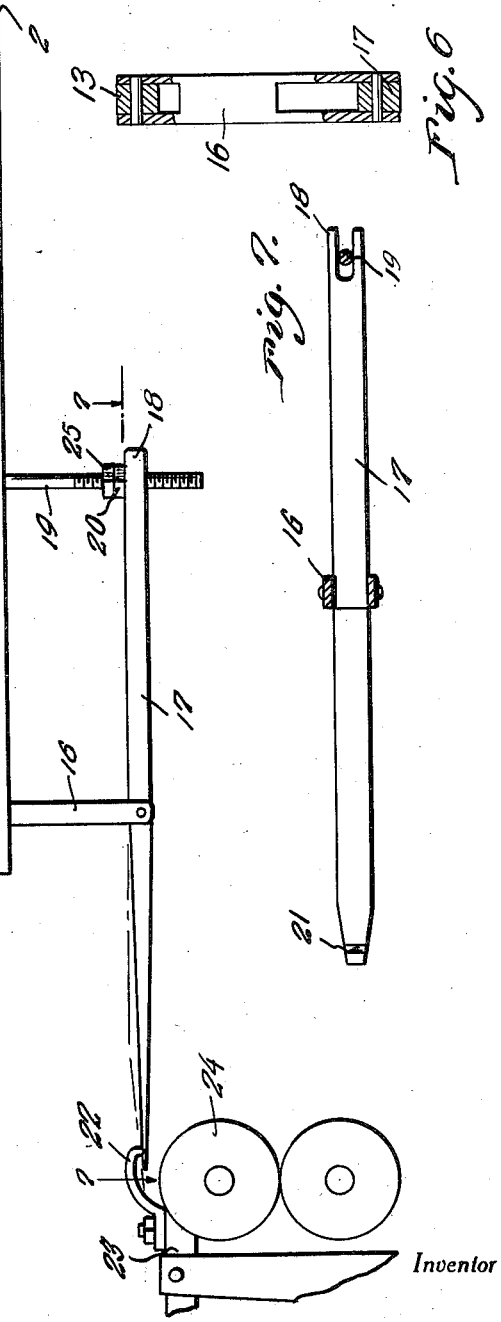
Inventor
*Ambrose Idail*
By *Clarence A. O'Brien*
Attorney

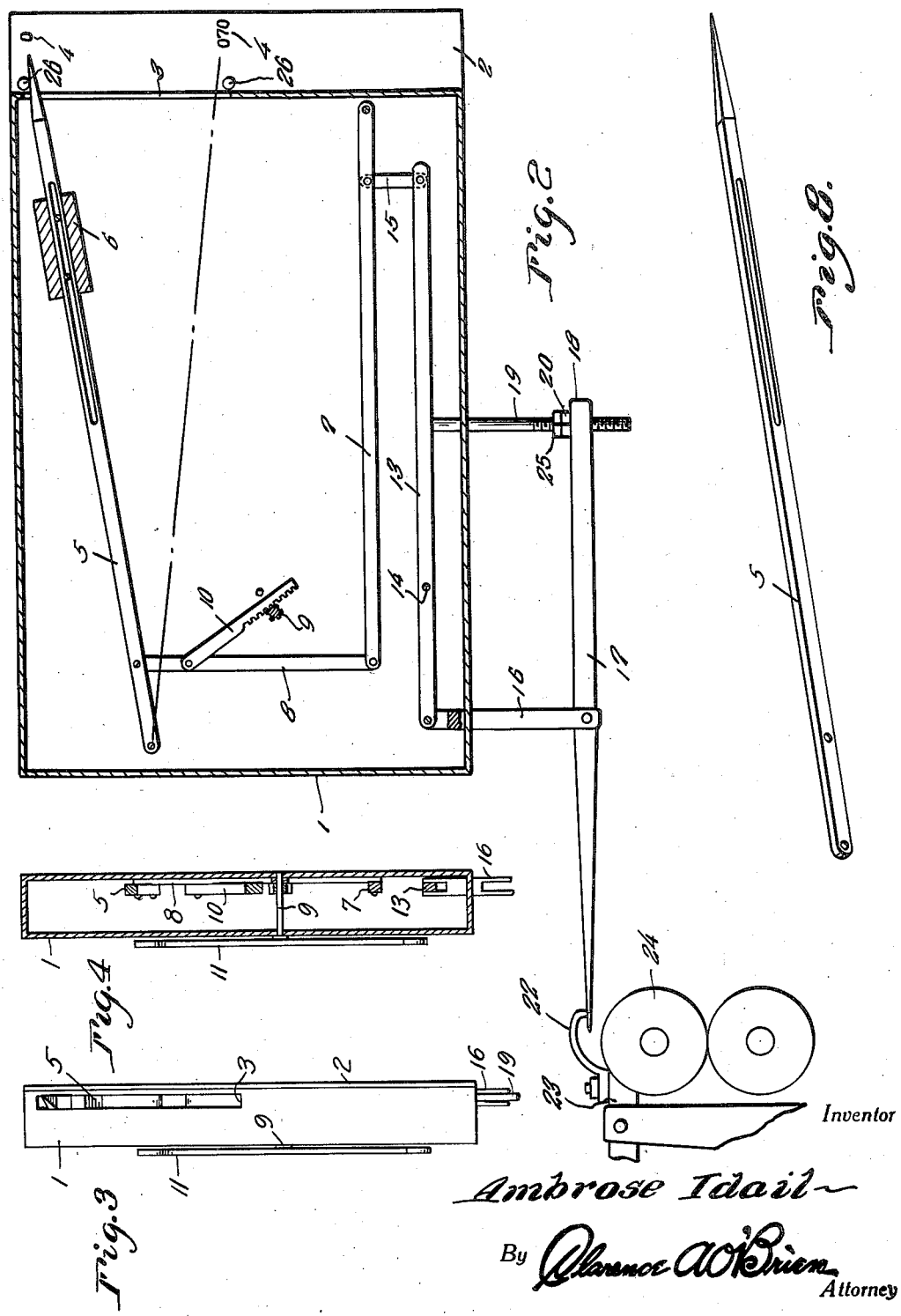

Patented Nov. 5, 1935

2,020,061

UNITED STATES PATENT OFFICE 2,020,061

INDICATOR

Ambrose Idail, Toronto, Ohio

Application June 13, 1935, Serial No. 26,506

3 Claims. (Cl. 33—147)

The present invention relates to new and useful improvements in indicators for paper making machines and has for its primary object to provide, in a manner as hereinafter set forth, a device of this character embodying a novel construction, combination and arrangement of parts through the medium of which any variation in the weight of the paper being fed to the machine will immediately be made apparent.

Another very important object of the invention is to provide an indicator of the character described which may be conveniently adjusted as desired.

Other objects of the invention are to provide an indicator of the character set forth which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in front elevation of an indicator constructed in accordance with the present invention.

Figure 2 is a view in vertical longitudinal section through the device.

Figure 3 is an end elevational view.

Figure 4 is a view in vertical transverse section through the invention.

Figure 5 is a view in horizontal section through one end portion of the indicator.

Figure 6 is a detail view partially in elevation and partially in section, showing the means for operatively connecting one of the beams to the lever.

Figure 7 is a horizontal sectional view, taken substantially on the line 7—7 of Figure 1.

Figure 8 is a detail view in perspective of the pointer.

Referring now to the drawings in detail, it will be seen that the embodiment of the invention which has been illustrated comprises a casing 1 of suitable material and dimensions, said casing including an extension 2 at one end, said one end being provided with a vertical slot 3. The extension 2 carries indicating numerals 4.

Pivotally mounted for swinging movement in a vertical plane in the casing 1 at a point adjacent the opposite end thereof is a pointer 5 the free end portion of which is operable in the slot 3 for coaction with the indicating numerals 4. Mounted for sliding adjustment on the pointer 5 is a weight 6 which is shown to advantage in Figure 2 of the drawings. Also pivotally mounted in the casing 1 for swinging movement in a vertical plane is a beam 7 the free end of which is operatively connected to the pointer 5, at an intermediate point, by a link 8. It will be observed that the beam 7 is pivotally mounted in the casing 1 at a point adjacent the end of said casing from which the extension 2 projects. A shaft 9 is journaled in the casing 1 between the pointer 5 and the beam 7, said shaft having fixed thereon a pinion gear with which a rack bar 10, which is pivotally mounted on the link 8, is engaged. Fixed on the shaft 9, exteriorly of the casing 1, is an indicator hand 11 which is cooperable with a dial 12 on the front of the casing 1.

The reference numeral 13 designates a beam which is pivotally mounted at an intermediate point in the casing 1, as at 14, below the beam 7. A link 15 operatively connects the beam 13, at one end, to the beam 7 at an intermediate point in the latter. Pivotally connected to the other end of the beam 13 is a depending link 16 which extends slidably through the bottom of the casing 1.

A lever 17 is pivotally mounted, at an intermediate point, for swinging movement in a vertical plane on the lower end portion of the link 16. At one end, the lever 17 terminates in a fork 18 which straddles a shank 19 which depends from the casing 1. The forked end portion of the lever 17 is engaged beneath a nut 20 which is threaded for adjustment on the shank 19. The other end portion of the lever 17 is beveled and has formed therein a transverse groove 21 (see Figure 7) for the reception of the downturned free end of a finger 22 which is mounted on the pivoted support 23 of the upper press roll 24 of the machine. A lock nut 25 is provided on the shank 19 for securing the nut 20 in adjusted position.

It is thought that the operation of the indicator will be readily apparent from a consideration of the foregoing, particularly to those skilled in the art to which the invention pertains. Should the upper roll 24 rise or fall due to any variation in the thickness of the paper from any cause, the hand 11 will immediately and accurately indicate the variation on the dial 12, said hand, of course, being actuated through the various elements operatively connecting said hand to the lever 17. Through the medium of the pointer 5 it may be readily ascertained if the indicator is properly adjusted. Stops 26 are provided on the extension 2 for the pointer 5.

It is believed that the many advantages of an indicator constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. An indicator for paper making machines comprising a casing, an indicator hand rotatably mounted on said casing, a pointer pivotally mounted in said casing, a pair of beams pivotally mounted in the casing, means operatively connecting said beams together, means operatively connecting one of said beams to a paper making machine for actuation thereby, means operatively connecting the other of said beams to the pointer, and means operatively connecting the indicator hand to the last-named means for actuation thereby.

2. An indicator of the class described for paper making machines comprising a casing, an indicator hand rotatably mounted on said casing, a pair of beams pivotally mounted in said casing, a link pivotally mounted on the free end portion of one of said beams, a lever pivotally mounted, at one of its intermediate points, on said link, adjustable stop means on the casing engaged with one end portion of the lever for limiting the swinging movement of said lever in one direction, means operatively connecting the other end portion of the lever to a paper making machine for actuation thereby, means operatively connecting the beams together, a pointer pivotally mounted in the casing, means operatively connecting said pointer to the other of the beams, and means operatively connecting the indicator hand to the last-named means for actuation thereby.

3. An indicator of the class described for paper making machines comprising a casing having a slot therein, an extension on said casing adjacent the slot having indicating numerals thereon, a pointer pivotally mounted in the casing and operable in the slot, said pointer being cooperable with the numerals, a weight adjustably mounted on the pointer, a pair of beams pivotally mounted in the casing, means operatively connecting the beams together, means operatively connecting the pointer with one of said beams, an indicator hand rotatably mounted on the casing, means operatively connecting said indicator hand to the last-named means for actuation thereby, a lever pivotally connected, at one of its intermediate points, to one end portion of the other of said beams, adjustable stop means on the casing engaged with said lever for limiting the swinging movement of said lever in one direction, and means operatively connecting said lever to a paper making machine for actuation thereby.

AMBROSE IDAIL.